United States Patent [19]
Rybicki et al.

[11] 3,829,239
[45] Aug. 13, 1974

[54] MULTIPLE ELEMENT JOURNAL BEARING
[75] Inventors: Robert C. Rybicki, Trumbull; Carl H. Keller, Jr., Southport, both of Conn.
[73] Assignee: United Aircraft Corporation, East Hartford, Conn.
[22] Filed: Feb. 21, 1973
[21] Appl. No.: 334,335

[52] U.S. Cl. .................................. 416/134, 416/141
[51] Int. Cl. .......................................... B64c 27/38
[58] Field of Search .............. 416/134, 141; 308/26

[56] References Cited
UNITED STATES PATENTS

| | | | |
|---|---|---|---|
| 2,855,232 | 10/1958 | Kozak | 308/26 UX |
| 3,039,831 | 6/1962 | Thomas | 308/26 |
| 3,115,373 | 12/1963 | Alexander | 308/22 |
| 3,241,892 | 3/1966 | Oishei | 308/26 |
| 3,556,673 | 1/1971 | Killian | 416/134 |
| 3,700,352 | 10/1972 | Gorndt | 416/134 |
| 3,711,168 | 1/1973 | Wendel et al. | 308/26 |
| 3,759,631 | 9/1973 | Rybicki | 416/134 |

FOREIGN PATENTS OR APPLICATIONS
1,066,811  10/1959  Germany ........................ 308/26

Primary Examiner—Everette A. Powell, Jr.
Attorney, Agent, or Firm—Russell M. Lipes, Jr.

[57] ABSTRACT

Journal bearing structure utilizing a plurality of cylindrical journal bearing elements supported by a resilient mounting within a housing, the bearing elements being spaced apart axially a finite amount.

4 Claims, 3 Drawing Figures

MULTIPLE ELEMENT JOURNAL BEARING

CROSS-REFERENCE TO RELATED APPLICATION

Some of the subject matter shown and claimed in this application is disclosed and claimed in a copending application Ser. No. 268,963, entitled "Elastomeric Bearing for a Helicopter Rotor" filed July 5, 1972, now U.S. Pat. No. 3,782,854 issued Jan. 1, 1974.

BACKGROUND OF THE INVENTION

1. Field of the Invention

This invention relates to journal bearings for shafts and more particularly to a multi-element journal bearing for a rotor blade retention shaft of a helicopter.

2. Description of the Prior Art

Journal bearings have been generally used for a long period of time, the typical structure being a bearing element of finite length mounted within a casing or housing structure. The length of the bearing element has been limited by the amount of edge loading created by the bending or misalignment of the shaft which is supported by the bearing. Due to this limitation, journal bearing elements can be subjected to high compressive loads per square inch of bearing surface with a resulting reduction in bearing life. Excessive edge loading causing shaft damage can result from using longer bearing elements.

U.S. Pat. No. 3,115,373 is directed to a journal bearing structure which can accommodate shaft misalignment only during assembly of the installation. The structure cannot accommodate changes in shaft alignment or shaft bending due to differing shaft loadings and the inherent flexibility of any structure. U.S. Pat. No. 2,494,023 is directed to a laminated, self-aligning bearing but the lack of axial spacing between the laminations prevents them from following the true shaft centerline contours during shaft misalignment and shaft bending. Relatively high corner loading of bearing laminates will occur. U.S. Pat. No. 2,554,008 is directed to the manufacturing of a composite bearing involving a plurality of bearing pads. The resulting structure does not provide continuous bearing element rings and, therefore, the inner diameter of the bearing cannot be controlled to provide and insure the proper bearing running clearance. Further, the thermal coefficient of the rubber supporting body will cause undesirable expansion and contraction of the bearing I.D. with temperature changes.

There is a need, therefore, for a truly flexible journal bearing for handling large loads which gives improved and reliable service, particularly in connection with helicopter rotor loads.

SUMMARY OF THE INVENTION

An object of the present invention is to provide an improved journal bearing structure.

Another object of the invention is to provide a truly flexible multi-element journal bearing for sustaining helicopter rotor loads.

Still another object of the invention is to provide a multi-element journal bearing structure which not only is capable of carrying normal radial loads and accommodating rotational and axial motion, but which also can accommodate shaft bending due to load and shaft misalignment without edge loading the bearing elements.

In accordance with the present invention, the bearing construction involves multiple cylindrical dry lubricated bearing elements molded with an elastomeric member into a housing to form an integral bearing unit. Each bearing element is free to align itself with any shaft position or condition within the limits of the elastomer flexibility. Even load distribution on each bearing element, therefore, can be achieved.

The bearing construction provides for improved performance in a journal bearing of any given size subjected to a typical helicopter rotor load and motion environment. It allows the use of journal bearings of substantially increased length, thereby reducing compressive load per square inch of bearing surface. Typically, journal bearing length has been limited by the amount of edge loading created by shaft bending or misalignment. The flexibility provided here overcomes this limitation.

DESCRIPTION OF A PREFERRED EMBODIMENT

Figure 1:
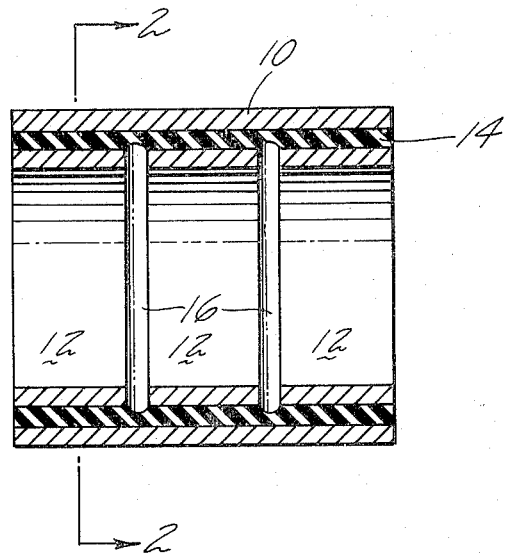
FIG. 1 is a sectional view of a multi-element journal bearing constructed in accordance with this invention.
Figure 2:
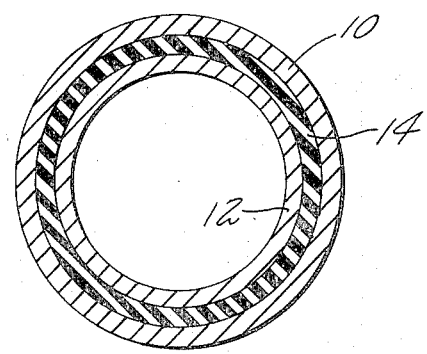
FIG. 2 is a section along line 2—2 in FIG. 1.

Referring to FIG. 1, the housing or outer race of the journal bearing is indicated at 10. A plurality of cylindrical bearing elements, in this instance three, are shown at 12. These elements may be dry lubricated and typically may be of teflon or carbon faced with a metal backing. The bearing elements are molded with an elastomer 14, such as rubber, in housing 10 to form an integral bearing unit. Bearing elements 12 are spaced apart a finite distance 16 to provide for a certain amount of cocking of any one element with respect to an adjacent element.

Figure 3:
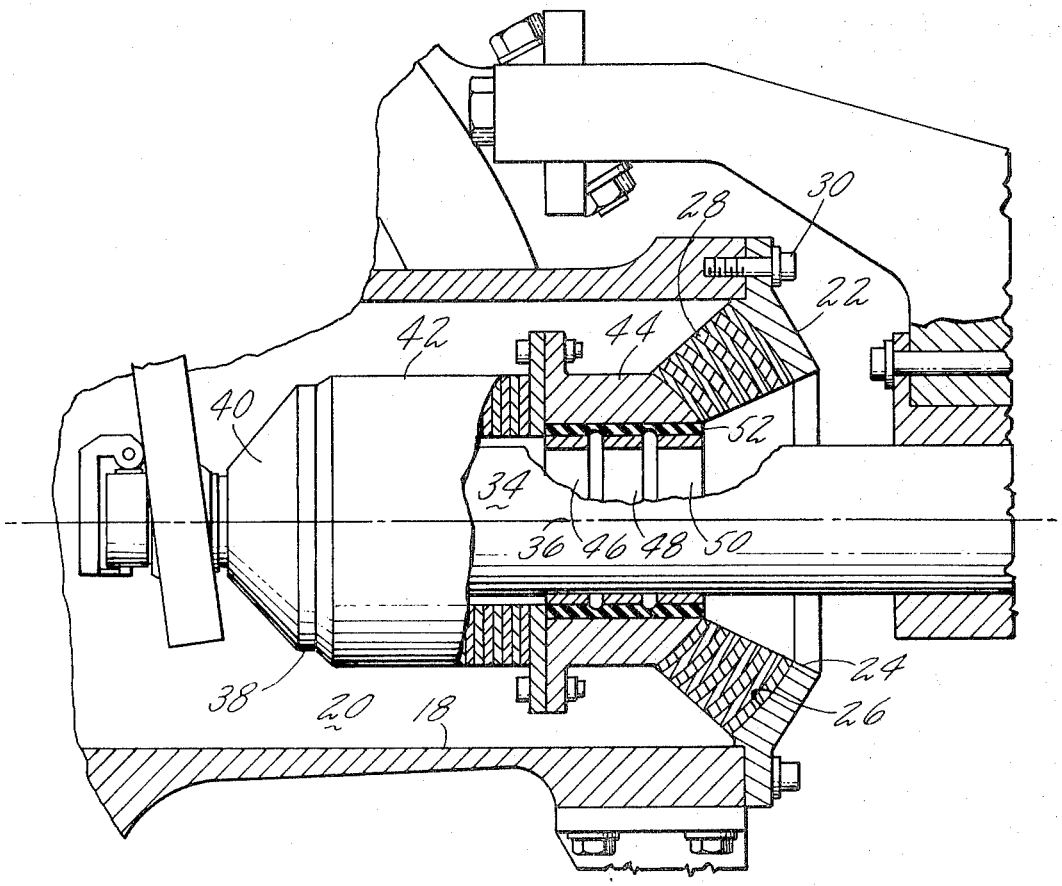
FIG. 3 is a top sectional view of a portion of an articulated helicopter rotor head using this invention.

In FIG. 3 an articulated rotor head hub is shown which includes housing 18 defining blade attachment chamber 20 therein. The housing is preferably cylindrical and extends substantially radially with respect to the axis of rotation of the rotor. Housing 18 may include as an integral part thereof, mouth-shaped member 22 which defines a substantially circular opening 24 into chamber 20 and which also defines spherical surface 26 of the outer race of laminated spherical, annular, elastomeric bearing 28. As shown in the drawing, outer race member 22 is separate from and connected to housing 18 by conventional connecting means 30.

A rotor blade is connected to housing 18 by shaft member 34 which is preferably positioned concentrically about the blade feathering or pitch change axis 36 and which has flanged or mushroom-shaped inner end 38. End 38 includes a stubshaft 40 which is connected thereto by conventional connecting means. Shaft 34 is connected to housing 18 through annular, flat or disc-type elastomeric bearing 42, connecting member 44, and annular spherical elastomeric bearing 28. Bearings 28 and 42 are preferably of the laminated type more fully disclosed in Hinks U.S. Pat. No. 2,900,182 with flat bearing 42 being of the type shown generally in FIG. 7 thereof and spherical bearing 28 being of the type shown generally in FIG. 8 thereof.

A journal bearing, constructed in accordance with this invention, is located within connecting member 44 between elastomeric bearings 28 and 42 and surrounds and supports blade shaft member 34. The journal bearing includes three bearing elements 46, 48 and 50 molded into elastomer 52 within member 44 in accordance with this invention. Thus a rotor blade is connected to housing 18 through shaft member 34, disc-type bearing 42, connecting member 44 and spherical bearing 28. The blade is supported within the connection by the journal bearing which, by virtue of its unique construction, has the flexibility to absorb any bending of blade shaft member 34 without edge loading the bearing elements and to absorb any misalignment due to the flexibility inherent in the elastomeric bearings and other structure.

Although the invention has been shown and described with respect to a preferred embodiment thereof, it should be understood by those skilled in the art that changes and omissions in the form and detail thereof may be made therein without departing from the spirit and scope of the invention, which is to be limited and defined only as set forth in the following claims.

We claim:

1. A bearing mounting for an articulated helicopter rotor in which a rotor blade is connected to a rotor head hub;
   said hub having an opening therein;
   a rotor blade member extending within said hub opening;
   a plurality of elastomeric bearings connecting said hub and said blade member;
   and a journal bearing within said connection supporting said blade member;
   said journal bearing including a plurality of relatively closely spaced bearing elements;
   elastic means molding said bearing elements with said connection;
   the edges of adjacent bearing elements being spaced apart sufficiently to permit independent alignment changes of said bearing elements.

2. A bearing mounting according to claim 1 in which said elastomeric bearings include an annular, flat, laminated elastomeric bearing and an annular, spherical, laminated elastomeric bearing.

3. In a helicopter rotor structure, a bearing mounting for connecting a rotor blade to a rotor head hub;
   said hub having an opening therein;
   a rotor blade member extending within said hub opening;
   a connection for said blade member to said hub including:
   an annular, flat elastomeric bearing connected to an end of said blade member;
   a connecting member connected to said flat elastomeric bearing;
   and an annular, spherical elastomeric bearing connected to said connecting member and said hub;
   a plurality of relatively closely spaced journal bearing elements mounted within said connecting member and supporting said blade member;
   elastic means molding said bearing elements into said connecting member to form an integral bearing unit;
   the edges of adjacent bearing elements being spaced apart sufficiently to permit relative alignment changes between individual bearing elements.

4. In a helicopter rotor structure, a bearing mounting in accordance with claim 3 in which the elements of the journal bearing are fully circumferential in extent.

* * * * *